(12) United States Patent
Weiss et al.

(10) Patent No.: US 7,877,402 B1
(45) Date of Patent: Jan. 25, 2011

(54) METHOD AND SYSTEM FOR PROVIDING NETWORK SEARCH RESULTS BASED IN PART ON A USER'S FINANCIAL DATA

(75) Inventors: Benjamin Weiss, Portola Valley, CA (US); Lisa Cohen Gevelber, Palo Alto, CA (US); Todd M. Fitch, Santa Clara, CA (US); James Robert Del Favero, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 410 days.

(21) Appl. No.: 12/014,711

(22) Filed: Jan. 15, 2008

(51) Int. Cl.
*G06F 17/30* (2006.01)
*G06F 7/00* (2006.01)

(52) U.S. Cl. .................. 707/759; 707/765; 707/770; 705/14.17; 705/35

(58) Field of Classification Search .............. 707/709, 707/710, 723, 759, 765, 770; 705/1, 9, 10, 705/26, 36, 14.17, 35
See application file for complete search history.

(56) References Cited

U.S. PATENT DOCUMENTS

| | | | | |
|---|---|---|---|---|
| 5,870,725 | A * | 2/1999 | Bellinger et al. | 705/45 |
| 6,185,567 | B1 * | 2/2001 | Ratnaraj et al. | 705/26 |
| 7,357,298 | B2 * | 4/2008 | Pokorny et al. | 705/8 |
| 7,596,513 | B2 * | 9/2009 | Fargo | 705/26 |
| 2001/0023414 | A1 * | 9/2001 | Kumar et al. | 705/35 |
| 2001/0051907 | A1 * | 12/2001 | Kumar et al. | 705/36 |
| 2002/0002513 | A1 * | 1/2002 | Chiasson | 705/27 |
| 2002/0040338 | A1 * | 4/2002 | Sick et al. | 705/37 |
| 2002/0042750 | A1 * | 4/2002 | Morrison | 705/26 |
| 2002/0095387 | A1 * | 7/2002 | Sosa et al. | 705/65 |
| 2002/0128981 | A1 * | 9/2002 | Kawan et al. | 705/67 |
| 2003/0033212 | A1 * | 2/2003 | Sandhu et al. | 705/26 |
| 2003/0069836 | A1 * | 4/2003 | Penney et al. | 705/37 |
| 2003/0126033 | A1 * | 7/2003 | Evans et al. | 705/26 |
| 2003/0154144 | A1 * | 8/2003 | Pokorny et al. | 705/28 |
| 2003/0154162 | A1 * | 8/2003 | Danaher et al. | 705/38 |
| 2003/0158795 | A1 * | 8/2003 | Markham et al. | 705/28 |
| 2004/0024638 | A1 * | 2/2004 | Restis | 705/14 |
| 2004/0133471 | A1 * | 7/2004 | Pisaris-Henderson et al. | 705/14 |
| 2004/0215556 | A1 * | 10/2004 | Merkley et al. | 705/38 |

(Continued)

OTHER PUBLICATIONS

Bruce Kogut—"The Small World of Firm Ownership and Acquisitions in Germany: The Durability of National Networks"—Santa Fe Workshop 2000, pp. 1-43.*

(Continued)

*Primary Examiner*—John E Breene
*Assistant Examiner*—Anh Ly
(74) *Attorney, Agent, or Firm*—Gunnison, McKay & Hodgson, L.L.P.; Philip McKay

(57) ABSTRACT

A method and system for providing relevant search results using financial data includes a process for providing relevant search results using financial data whereby a user's financial transaction data is obtained from one or more sources. A user then initiates a network search using one or more network search parameters such as one or more keywords and/or phrases. The scope of the one or more network search parameters, and therefore the scope of the network search, are then determined and/or modified based, at least in part, on the user's financial data.

26 Claims, 3 Drawing Sheets

U.S. PATENT DOCUMENTS

| | | | | |
|---|---|---|---|---|
| 2005/0114336 A1* | 5/2005 | Wesinger et al. | 707/9 |
| 2005/0187866 A1* | 8/2005 | Lee | 705/39 |
| 2005/0222929 A1* | 10/2005 | Steier et al. | 705/35 |
| 2005/0222957 A1* | 10/2005 | Understein | 705/43 |
| 2005/0278246 A1* | 12/2005 | Friedman et al. | 705/38 |
| 2006/0229998 A1* | 10/2006 | Harrison et al. | 705/78 |
| 2007/0043730 A1* | 2/2007 | Wisely | 707/10 |
| 2007/0078837 A1* | 4/2007 | Indeck et al. | 707/3 |
| 2008/0040151 A1* | 2/2008 | Moore | 705/2 |
| 2008/0059364 A1* | 3/2008 | Tidwell et al. | 705/38 |
| 2008/0082349 A1* | 4/2008 | Zackrison et al. | 705/1 |
| 2008/0091535 A1* | 4/2008 | Heiser et al. | 705/14 |
| 2008/0221958 A1* | 9/2008 | Baumgartner et al. | 705/8 |
| 2008/0243787 A1* | 10/2008 | Stading | 707/3 |
| 2008/0288374 A1* | 11/2008 | Stremler et al. | 705/30 |
| 2009/0024536 A1* | 1/2009 | Archer et al. | 705/36 R |
| 2009/0106136 A1* | 4/2009 | Wright | 705/35 |
| 2009/0106144 A1* | 4/2009 | Del Favero et al. | 705/39 |
| 2009/0254572 A1* | 10/2009 | Redlich et al. | 707/10 |

OTHER PUBLICATIONS

Walker et al.—"The Small World of Germany and the Durability of National Networks"—American Sociological review, vol. 66, No. 3 Jun. 2000, pp. 317-335.*

* cited by examiner

METHOD AND SYSTEM FOR PROVIDING NETWORK SEARCH RESULTS BASED IN PART ON A USER'S FINANCIAL DATA

BACKGROUND

Networks of computing systems such as the Internet, have emerged as the information source of choice for many individuals and organizations. An important component of the acceptance, and ultimate success, of networks, and the Internet in particular, has been the introduction, and continued evolution, of network/Internet search engines, also referred to herein as "search engines".

In typical operation, a user provides the search engine with one or more network search parameters, often in the form of one or more keywords or phrases. Typically, the one or more network search parameters are entered by the user into an interface display on a computing system using an interface device, such as a mouse, keyboard, voice entry system, or similar mechanism for converting user actions into computing system implemented operations. Once the one or more network search parameters are provided to the search engine by the user, the typical search engine then uses the one or more network search parameters to perform a search of one or more networks, such as the Internet, for web-pages/sites, files, or any other data sources, that match, partially match, or are related to, the one or more network search parameters provided to the search engine by the user. Once found, links to the web-pages/sites, files, or any other data sources, that match, partially match, or are related to, the one or more network search parameters, also called "search results", are displayed to the user in a search results display page. In many instances, the search results are displayed in one or more display sections of the search results display page as a listing of links that, when selected by the user, take the user to the selected web-page/site, file, or other data source.

Typically, the search engine includes algorithms that determine how the one or more network search parameters provided to the search engine by the user are interpreted to perform the search and/or how closely a given file, web-page/site, or other data source must be to the one or more network search parameters in order to be displayed as a search result, i.e., the search engine determines the definition, scope and range of equivalents applied to the one or more network search parameters provided to the search engine by the user. Currently, the definition, scope and range of equivalents applied to the one or more network search parameters provided to the search engine by the user is typically determined on the general usage/meaning of the one or more network search parameters along with, in some instances, data regarding historical searches performed by the user, data regarding the historical usage of the one or more network search parameters by other users of the search engine, and/or other search related and/or generalized user related data obtained by the search engine from its own operation.

In addition, currently, the arrangement of search results in the search results display, i.e., the order in which the search results are displayed and/or location on the display screen of specific search results is also typically determined by the search engine. Currently, search engines have evolved such that the search results are often displayed in at least two types of formats; algorithmic search results displays and sponsored search results displays.

Algorithmic search results displays list the search results in an order that is determined by one or more algorithmic search results display rules that are typically independent of the owner/sponsor/source of a given search result. Current algorithmic search results display rules are often highly sophisticated and are typically proprietary to the provider of the search engine. Simple examples of basic algorithmic search results display rules include, but are not limited to: listing search results in an order based on the relevancy of a given search result to the one or more network search parameters provided to the search engine by the user, i.e., how closely a given search result matches the one or more network search parameters, typically with the most relevant search results being listed first; how often, or how many of, the one or more network search parameters appear in the search result, typically with the search results having the most occurrences being listed first; how many users have viewed the search results, typically with the search results having the most viewings being listed first; how many other data sources, files, or web-pages/sites link to the search results, typically with the search results being most linked to being listed first; and/or any combination of the forgoing algorithmic search results display rules or any one or more of numerous other algorithmic search results display rules.

Unlike typical algorithmic search results displays, sponsored search results displays typically list the search results in a both a relevancy ranked order and an order, and/or in a location, that is determined based on the owner/sponsor/source of a given search result and the owner/sponsor/source paying a fee to the search engine provider to have the owner's/sponsor's/source's web-page/site, file, or other data source, displayed in a specific order, and/or in a specific location, within the sponsored search results display.

Currently, many search engines provide algorithmic search results displays and sponsored search results displays in a single search results display page, typically with the algorithmic search results display in the middle section of the search results display page and the sponsored search results displays at the top, bottom, and/or side of the search results display page.

Typically, users of a search engine desire search results that are as accurate and customized to the user as possible. In addition, owners/sponsors/sources of a given search result that pay fees to the search engine provider to have the owner's/sponsor's/source's web-page/site, file, or other data source, displayed in a specific order, and/or in a specific location, within the sponsored search results display, want to target users of he search engine as specifically as possible. However, using currently available search engines the ability to customize search results to a specific user is limited by a lack of knowledge about the user other than, typically at best, historical search data.

SUMMARY

In accordance with one embodiment, a method and system for providing relevant search results using financial data includes a process for providing relevant search results using financial data whereby, in one embodiment, a user's financial data is obtained from one or more sources. In one embodiment, a user then initiates a network search using one or more network search parameters such as one or more keywords and/or phrases. In one embodiment, the scope of the one or more network search parameters, and therefore the scope of the network search, is determined, at least in part, based on the user's financial data. In one embodiment, the order of the search results listed in an algorithmic search results display and/or the order and/or position of the search results listed in a sponsored search results display is also determined, at least in part, based on the user's financial data.

In one embodiment, the user's financial data is obtained from one or more sources using, and/or through, a computing system implemented financial management system. Herein, a computing system implemented financial management system can be, but is not limited to, any of the following: a computing system implemented personal financial management system; a computing system implemented home inventory system; a computing system implemented business inventory system; a computing system implemented point-of-sale system; a computing system implemented personal asset management system; a computing system implemented business asset management system; a computing system implemented personal accounting system; a computing system implemented business accounting system; a computing system implemented tax preparation system; and/or any of the numerous computing system implemented financial management systems known to those of skill in the art.

In one embodiment, the user's financial data includes data regarding specific financial transactions conducted by the user including, but not limited to: dates of specific financial transactions; payees/payers associated with specific financial transactions; categories of specific financial transactions; total expenditures in specific financial transaction categories over designated time frames; specific items purchased through specific financial transactions; and/or any other data regarding specific financial transactions desired and/or available.

In one embodiment, the user's financial data includes data regarding the user's general and/or overall financial status, including, but not limited to: the user's total assets; the user's total liabilities/debt; the user's net worth; the user's average discretionary spending; the user's age group; various demographic data regarding the user and/or the user's spending; and/or any other data regarding the user's general and/or overall financial status desired and/or available.

In one embodiment, the user initiates a network search by providing the one or more network search parameters through an interface display on a computing system using an interface device, such as a mouse, keyboard, voice entry system, or similar mechanism for converting user actions into computing system implemented operations.

In one embodiment, how the one or more network search parameters provided to the search engine by the user are interpreted/defined to perform the search and/or how closely a given data, file, web-page, or other data source must be to the one or more network search parameters in order to be displayed as a search result, i.e., the definition, scope and range of equivalents applied to the one or more network search parameters provided to the search engine by the user is determined and/or modified based, at least in part, on the user's financial data along with general usage/meaning of the one or more network search parameters as well as, in one embodiment, data regarding historical searches performed by the user, data regarding the historical usage of the one or more network search parameters by other searchers, and/or other search related and/or generalized user related data.

In one embodiment, the scope of an algorithmic search and the algorithmic search results display rules, i.e., the order of the search results listed in an algorithmic search results display, is determined, at least in part, based on the user's financial data.

In one embodiment, a listing order/position, and/or placement location, of a given search result in a sponsored search results section of a search results display page is offered to a given search result's owner/sponsor/source based, at least in part, on the user's financial data, and the price paid for the listing order/position, and/or placement location, of the given search result in the sponsored search results display section of the search results display page is determined based, at least in part, on the user's financial data.

In one embodiment, the algorithmic search results display and/or the sponsored search results display are provided to the user in one or more search results display pages.

Using the method and system for providing relevant search results using financial data disclosed herein, users are provided algorithmic and/or sponsored search results that are more accurate and customized to the user based on the user's financial data. In addition, using the method and system for providing relevant search results using financial data disclosed herein, owners/sponsors/sources of search results shown in a sponsored search results display can target users more specifically based on the user's financial data. Consequently, using the method and system for providing relevant search results using financial data disclosed herein, the ability to customize search results to a specific user is improved significantly.

As discussed in more detail below, using the below embodiments, with little or no modification and/or user input, there is considerable flexibility, adaptability, and opportunity for customization to meet the specific needs of various users under numerous circumstances.

Figure 1:
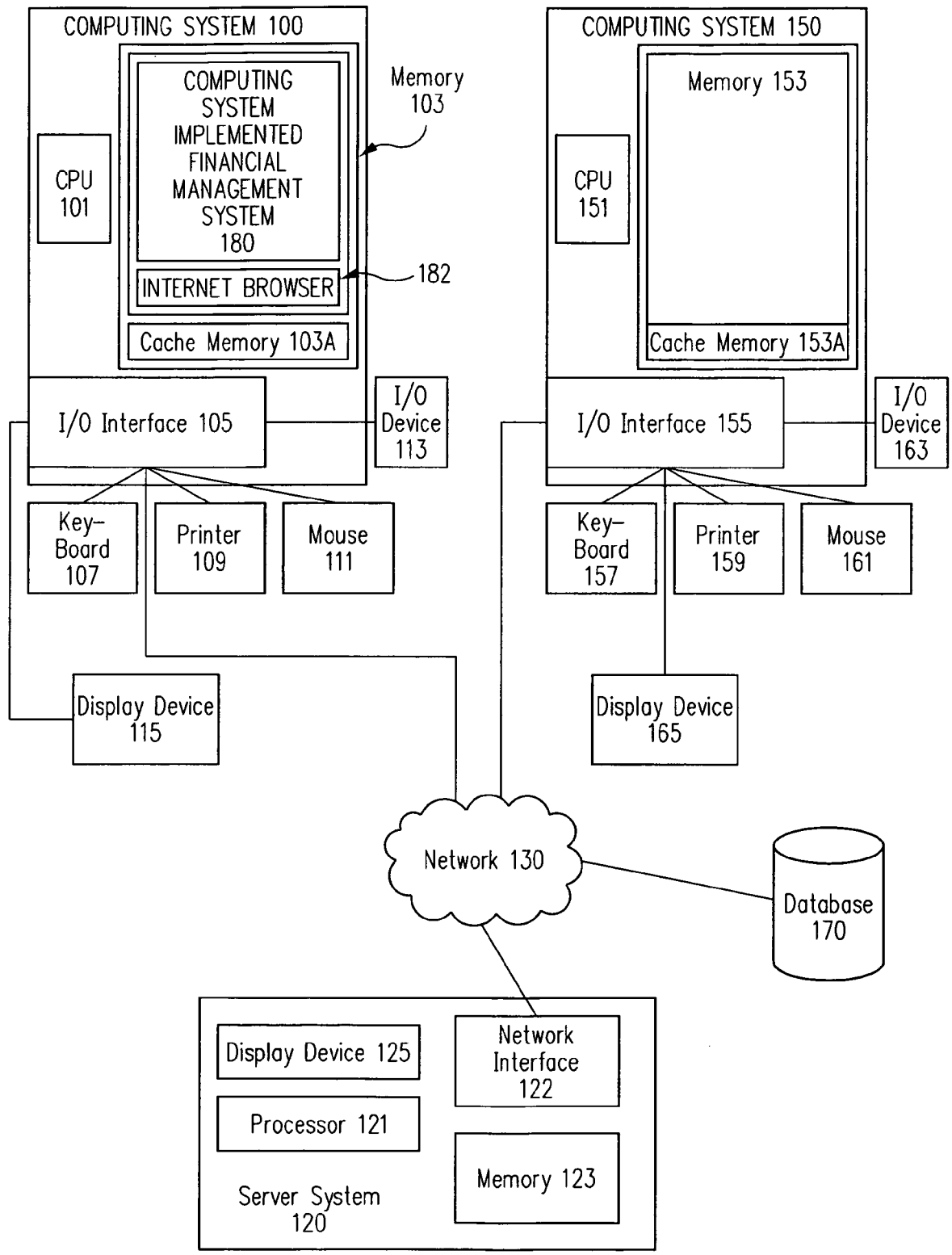
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

For illustrative purposes, some embodiments are described herein within the framework of, and using, one or more computing system implemented financial management systems. Various specific details are discussed below, and shown in the accompanying FIG.s, to aid one of skill in the art in understanding the invention. However, such specific details are intended to be illustrative only, and are not intended to restrict in any way the scope as claimed herein. In addition, the particular terminology used herein is intended to be illustrative and exemplary only, and in no way limits the scope as claimed.

In accordance with one embodiment, a method and system for providing relevant search results using financial data includes a process for providing relevant search results using financial data whereby, in one embodiment, a user's financial data is obtained from one or more sources. In one embodiment, a user then initiates a network search using one or more network search parameters such as one or more keywords and/or phrases. In one embodiment, the scope of the one or more network search parameters, and therefore the scope of the network search, is determined, at least in part, based on the user's financial data. In one embodiment, the order of the search results listed in an algorithmic search results display and/or the order and/or position of the search results listed in a sponsored search results display is also determined, at least in part, based on the user's financial data.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether known at the time of filing or as developed later. Some embodiments are implemented in a mobile computing system running mobile operating systems such as Symbian® OS, Windows® Mobile, or any other operating system designed to generally manage operations on a mobile computing system, whether known at the time of filing or as developed later. As described more fully below, embodiments can be implemented on computing systems other than a conventional computing system such as, for example, a personal digital assistant, a cell phone, or other computing system capable of processing computer readable data, whether known at the time of filing or as developed later. Computing systems also include those in which one or more computing resources (hardware or software) are located remotely and accessed via network, such as a Local Area Network (LAN), Wide Area Network (WAN), a public network, such as the Internet, a private network, a combination of network types, a computing system bus, or other electronic medium in which data may be exchanged between one computing system and one or more other computing system(s), whether known at the time of filing or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, delivered from a website and/or web-based function, transmitted to a remote device, stored on any database, computer server or other storage mechanism, printed, or used in any other way. In addition, in some embodiments, processes and/or systems described herein may make use of input provided to the computer device implementing a process and/or application, discussed herein, via user interface devices such as a keyboard, mouse, touchpad, or any other device capable of providing user input to a computing system or for translating user actions into computing system operations, whether known at the time of filing or as developed later.

Hardware System Architecture

FIG. 1 is a block diagram of an exemplary hardware architecture for implementing one embodiment of a system and method for providing relevant search results using financial data, such as exemplary processes 200 and/or 300 (FIG. 2 and FIG. 3) discussed herein, that, returning to FIG. 1, includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part of, a computing system implemented financial management system 180 such as, but not limited to: a computing system implemented personal financial management system; a computing system implemented business financial management system; a computing system implemented personal accounting system; a computing system implemented business accounting system; a computing system implemented tax preparation system; a computing system implemented healthcare management system; or any other computing system implemented personal and/or business data management system. In one embodiment, computing system implemented financial management system 180 is stored, in whole, or in part, in memory system 103, and is used by, or includes, as discussed below, a process for providing relevant search results using financial data, such as exemplary processes 200 and/or 300 (FIG. 2 and FIG. 3) discussed below.

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for providing relevant search results using financial data and/or a computing system implemented financial management system are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, computing system 100 is a computing system accessible by a user and used and/or accessible by another computing system, such as computing system 150 (discussed below), a workstation, a two-way pager, a cellular telephone, a smart phone, a digital wireless telephone, a Personal Digital Assistant (PDA), a server computer, an Internet appliance, any other device, or any desired combination of these devices, that includes components that can execute all, or part, of a process for providing relevant search results using financial data, and/or a computing system implemented financial management system, in accordance with at least one of the embodiments as described herein.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 is accessible by a process for providing relevant search results using financial data, and/or a computing system implemented financial management system and, in one embodiment, memory system 153 includes all, or part of, data representing a user's financial data and/or algorithmic and/or sponsored search results, such as those discussed below.

As discussed in more detail below, in one embodiment, all, or part of, a process for providing relevant search results using financial data, and/or a computing system implemented financial management system, can also be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of the user, and/or the user's agents, and/or a process for providing relevant search results using financial data, such as exemplary processes 200 and/or 300 (FIG. 2 and FIG. 3), and/or a computing system implemented data management system, such as a computing system implemented financial management system 180 (FIG. 1).

In one embodiment, database 170 is used, controlled, and/or accessible by, a provider of and/or a system and process for providing relevant search results using financial data, such as processes for providing relevant search results using financial data 200 and/or 300 (FIGS. 2 and 3) and data representing all, or part, of a user's financial data is stored in database 170 (FIG. 1), typically in accounts associated with a given user. In one embodiment, database 170 is used, controlled, and/or accessible by, a provider of and/or a system and process for providing relevant search results using financial data and data representing the search results of one or more algorithmic and/or sponsored searches is stored in database 170. In one embodiment, database 170 is used, controlled, and/or accessible by, a provider of and/or a computing system implemented financial management system, such as a computing system implemented financial management system 180, and data representing all, or part, of a user's financial data is stored in database 170, typically in accounts associated with a given user. In one embodiment, database 170 is used, controlled, and/or accessible by, a provider of and/or a computing system implemented financial management system, such as a computing system implemented financial management system 180, and data representing the search results of one or more algorithmic and/or sponsored searches is stored in database 170.

In one embodiment, computing systems 100 and 150, and database 170, are coupled to a server system 120 through network 130. In one embodiment, server system 120 typically includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, server system 120 is used, controlled, and/or accessible by, a provider of and/or a system and process for providing relevant search results using financial data, such as processes for providing relevant search results using financial data 200 and/or 300 (FIGS. 2 and 3), and data representing all, or part, of a user's financial data is stored in server system 120 (FIG. 1), typically in accounts associated with a given user. In one embodiment, server system 120 is used, controlled, and/or accessible by, a provider of and/or a computing system implemented financial management system, such as a computing system implemented financial management system 180, and data representing all, or part, of a user's financial data is stored in server system 120, typically in accounts associated with a given user.

Network 130 can be any network or network system that is of interest to a user such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network 130, as discussed herein. In addition, the particular type of, and configuration of, computing systems 100 and 150, database 170, and server system 120 are not relevant.

As discussed in more detail below, in one embodiment, a process for providing relevant search results using financial data, such as processes for providing relevant search results using financial data 200 and 300 (FIGS. 2 and 3), and/or a computing system implemented financial management system, such as a computing system implemented financial management system 180 (FIG. 1), and/or data representing one or more search results, are stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for providing relevant search results using financial data, such as processes for providing relevant search results using financial data 200 and/or 300 (FIGS. 2 and 3), and/or a computing system implemented financial management system, such as computing system implemented financial management system 180 (FIG. 1), are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing relevant search results using financial data and/or a computing system implemented financial management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for providing relevant search results using financial data, such as processes for providing relevant search results using financial data 200 and/or 300 (FIGS. 2 and 3), and/or a computing system implemented financial management system, such as a computing system implemented financial management system 180 (FIG. 1), and/or search results data, and/or a user's financial data, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

For example, all, or part, of a process for providing relevant search results using financial data, such as processes for providing relevant search results using financial data 200 and/or 300 (FIGS. 2 and 3), and/or a computing system implemented financial management system, such as a computing system implemented financial management system 180 (FIG. 1), and/or search results data, and/or a user's financial data, may be stored in a memory that is physically located in a location, such as server system memory 123, or database 170, of FIG. 1, different from a computing system, such as computing systems 100 and/or 150 of FIG. 1, utilizing a process for providing relevant search results using financial data, and/or a computing system implemented financial management system, and/or data representing search results, and/or a user's financial data. In one embodiment, all, or part, of a process for providing relevant search results using financial data, and/or a computing system implemented financial management system, and/or data representing search results, and/or a user's financial data, may be stored in a memory that is physically located, separate from the computing system's processor(s), such as CPUs 101 and 151 of FIG. 1, and the computing system CPUs can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server systems, such as computing systems 100 and/or 150 and/or server system 120 of FIG. 1, running and/or utilizing and/or storing all, or part, of a process for providing relevant search results using financial data, such as processes for providing relevant search results using financial data 200 and/or 300 (FIGS. 2 and 3), and/or a computing system implemented financial management system, such as a computing system implemented financial management system 180 (FIG. 1), and/or search results data, and/or a user's financial data, is a portable computer, a workstation, a two-way pager, a cellular telephone, a smart phone, a digital wireless telephone, a PDA, a server computer, an Internet appliance, or any other device that includes components that can execute all, or part, of a process for providing relevant search results using financial data, and/or a computing system implemented financial management system, in accordance with at least one of the embodiments as described herein. Similarly, in another embodiment, a process for providing relevant search results using financial data, such as processes for providing relevant search results using financial data 200 and/or 300 (FIGS. 2 and 3), and/or a computing system implemented financial management system, such as a computing system implemented financial management system 180 (FIG. 1), and/or search results data, and/or a user's financial data, may be implemented on, and/or run, and/or stored on, a computing system and/or server system that is made up of multiple different computers, wireless devices, cellular telephones, digital telephones, two-way pagers, personal digital assistants, server computers, or any desired combination of these devices, that are coupled to perform the processes and/or operations as described herein.

Process

Herein, the terms "user", "individual", "consumer", and/or "customer" are used interchangeably to denote any party and/or entity interfacing and/or interacting with a process for providing relevant search results using financial data, and/or a person and/or entity that is the subject of, and/or target of, all, or part of, any data/information obtained by a process for providing relevant search results using financial data, and/or a legal guardian of a person and/or entity that is the subject of, and/or target of, any data/information obtained by a process for providing relevant search results using financial data, and/or an authorized agent of any party interfacing and/or interacting with a process for providing relevant search results using financial data, and/or a person and/or entity that is the subject of, and/or target of, any information obtained by a process for providing relevant search results using financial data, and/or any other authorized party associated with any party interfacing and/or interacting with a process for providing relevant search results using financial data, and/or a person and/or entity that is the subject of, and/or target of, any information obtained by a process for providing relevant search results using financial data.

Herein, the term "search engine", "network search engine", and "Internet search engine" are used to denote any program, process, or procedure, including, in one embodiment, a process for providing relevant search results using financial data, used to search a network, such as the Internet, and obtain search results.

As used herein, the term computing system implemented financial management system includes, but is not limited to: computing system implemented personal and small business financial management systems, packages, programs, modules, or applications; computing system implemented business systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether known at the time of filling or as developed later.

As used herein, the term "network" is used to demote any network or network system that is of interest to a user such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

In accordance with one embodiment, a method and system for providing relevant search results using financial data includes a process for providing relevant search results using financial data whereby, in one embodiment, a user's financial data is obtained from one or more sources. In one embodiment, a user then initiates a network search using one or more network search parameters such as one or more keywords and/or phrases. In one embodiment, the scope of the one or more network search parameters, and therefore the scope of the network search, is determined, at least in part, based on the user's financial data. In one embodiment, the order of the search results listed in an algorithmic search results display and/or the order and/or position of the search results listed in a sponsored search results display is also determined, at least in part, based on the user's financial data.

Figure 2:
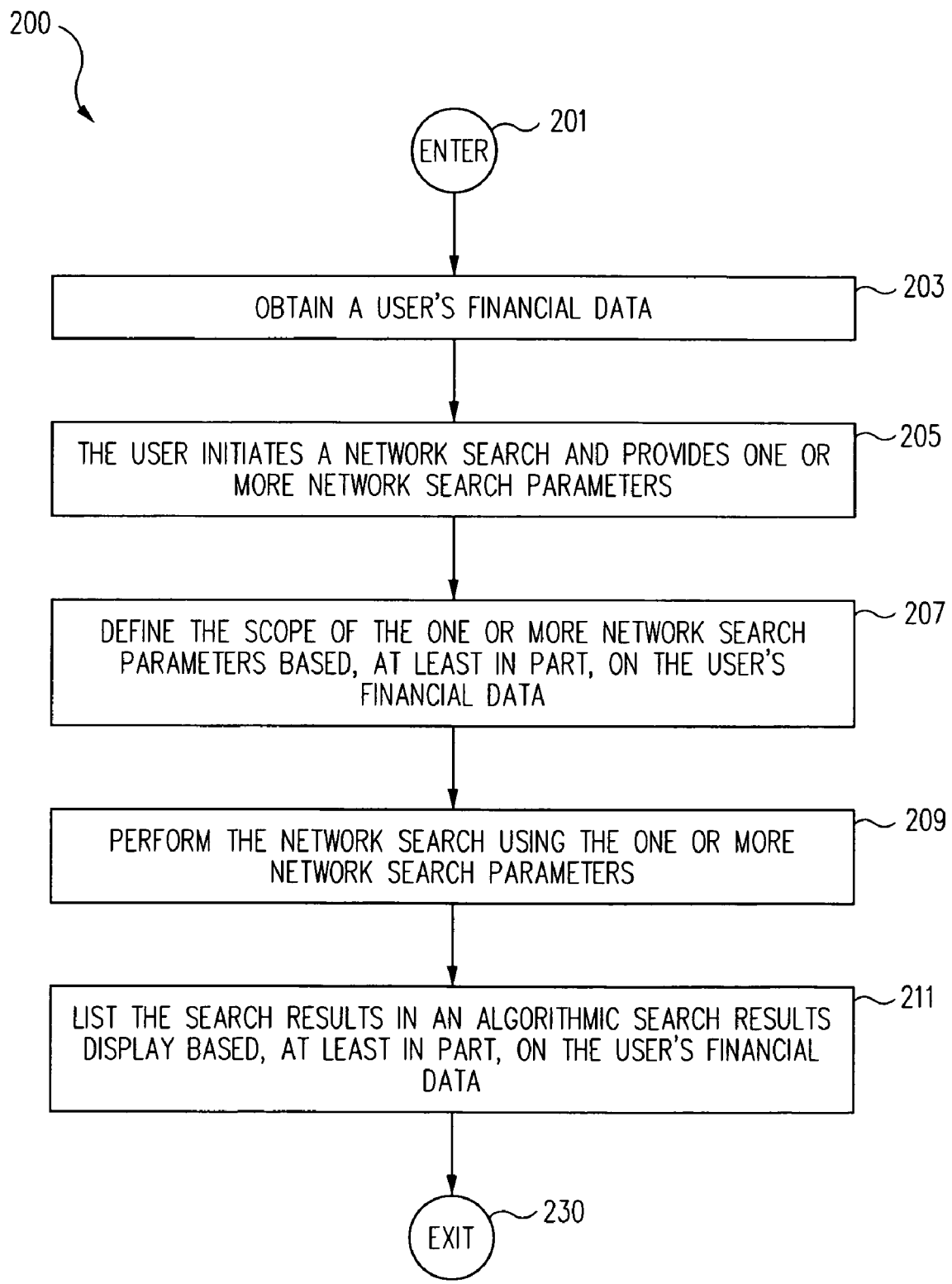
FIG. 2 is a flow chart depicting a process for providing relevant search results using financial data in accordance with one embodiment.

FIG. 2 is a flow chart depicting a process for providing relevant search results using financial data 200 in accordance with one embodiment. Process for providing relevant search results using financial data 200 begins at ENTER OPERATION 201 of FIG. 2 and process flow proceeds to OBTAIN A USER'S FINANCIAL DATA OPERATION 203.

In one embodiment, at OBTAIN A USER'S FINANCIAL DATA OPERATION 203 a user's financial data is obtained from one or more sources. In one embodiment, at OBTAIN A USER'S FINANCIAL DATA OPERATION 203 the user's financial data represents the user's general and/or overall financial status, including, but not limited to: the user's total assets; the user's total liabilities/debt; the user's net worth; the user's average discretionary spending; the user's age group; various demographic data regarding the user and/or the user's spending; and/or any other data regarding the user's general and/or overall financial status desired and/or available.

In one embodiment, at OBTAIN A USER'S FINANCIAL DATA OPERATION 203 the user's financial data represents various financial transactions conducted by the user. In one embodiment, at OBTAIN A USER'S FINANCIAL DATA OPERATION 203 the financial data representing various financial transactions conducted by the user includes, but is not limited to, data representing: dates of specific financial transactions; payees/payers associated with specific financial transactions; categories of specific financial transactions; total expenditures in specific financial transaction categories over designated time frames; specific items purchased through specific financial transactions; and/or any other data regarding specific financial transactions desired and/or available.

In one embodiment, at OBTAIN A USER'S FINANCIAL DATA OPERATION 203 the user's financial data is obtained by process for providing relevant search results using financial data 200 using, and/or through, and/or from, a computing system implemented financial management system.

In one embodiment, the user's financial data obtained at OBTAIN A USER'S FINANCIAL DATA OPERATION 203 includes data associated with financial transactions conducted using multiple payment methods and/or accounts to provide as complete a set of user financial data as possible. For instance, in one embodiment, the user's financial data is obtained at OBTAIN A USER'S FINANCIAL DATA OPERATION 203 from, but not limited to, any one or more of the following sources: banks; debit cards and/or accounts; credit unions; credit cards and/or accounts and/or credit card/account providers; asset accounts and/or asset account providers; one or more user controlled computing system implemented financial management systems; or other financial resources, accounts and/or services used by a user to pay for and/or conduct financial transactions.

In addition, in some embodiments, the user's financial data obtained at OBTAIN A USER'S FINANCIAL DATA OPERATION 203 is obtained from multiple sources of the same type. For instance, in one embodiment, the user's financial data is obtained at OBTAIN A USER'S FINANCIAL DATA OPERATION 203 from: two or more banks; two or more debit cards and/or accounts; two or more credit unions; two or more credit cards and/or accounts and/or credit card/account providers; two or more asset accounts and/or asset account providers; two or more user controlled computing system implemented financial management systems; and/or two or more other financial resources, accounts and/or services used by a user to pay for and/or conduct financial transactions.

As noted above, in one embodiment, all, or part, of the user's financial data is obtained by process for providing relevant search results using financial data 200 at OBTAIN A USER'S FINANCIAL DATA OPERATION 203 from, or using, a computing system implemented financial management system, such as computing system implemented financial management system 180 (FIG. 1), that implements, includes, is accessed by, and/or is otherwise associated with process for providing relevant search results using financial data 200 (FIG. 2).

Currently, various computing system implemented financial management systems are available including: computing system implemented personal financial management systems; computing system implemented small business financial management systems; computing system implemented home inventory systems; computing system implemented tax preparation systems; computing system implemented business accounting systems; and computing system implemented medical expense management systems; as well as various other electronic transaction data driven financial management systems.

Computing system implemented financial management systems typically help users manage their finances by providing a centralized interface with banks, credit card companies, and other various financial institutions and/or accounts, for identifying, processing, storing, and categorizing user financial transactions and other user financial data. Currently, computing system implemented financial management systems typically obtain financial transaction information, such as payee identification, payee location, payment amount, date of the transaction, time of transaction, items purchased, the type of transaction, etc., via communication with banks, credit card providers, or other financial institutions, using electronic data transfer systems such as the Open Financial Exchange (OFX) specification or various other systems for transferring financial transaction data.

As noted above, using computing system implemented financial management systems, the financial transaction information, payee identification, payee location, payment amount, date of the transaction, and other data is often used by the computing system implemented financial management system to categorize individual financial transactions as a particular type of income or expense. Some currently offered computing system implemented financial management systems then use this financial transaction information to track events, such as purchase events, and to provide various historical data reports or displays including "to date" data reports such as historical spending data reports in one or more particular categories.

In one embodiment, the user's financial data obtained using one or more computing system implemented financial management systems is transferred, or otherwise made available to, process for providing relevant search results using financial data 200 at OBTAIN A USER'S FINANCIAL DATA OPERATION 203.

In one embodiment, all, or part, of the user's financial data is obtained by process for providing relevant search results using financial data 200 at OBTAIN A USER'S FINANCIAL DATA OPERATION 203 from invoices/bills and/or receipt data provided to process for providing relevant search results using financial data 200, and/or an associated computing system implemented financial management system, by one or more merchants and/or product and/or service providers. In one embodiment, the invoice/bill and/or receipt data includes "level 3" data indicating, among other things, the line item entry and product and/or service identification for each item purchased in the transaction.

As noted above, in one embodiment, process for providing relevant search results using financial data 200 is associated with a computing system implemented financial management system, such as computing system implemented financial management system 180 of FIG. 1, that implements, includes, is accessed by, and/or is otherwise associated with process for providing relevant search results using financial data 200 (FIG. 2). Some of these computing system implemented financial management systems provide the capability to obtain, receive, and/or process electronic copies of the invoices/receipts from one or more merchants and/or product and/or service providers, often in their specific formats, and then store the data for use by process for providing relevant search results using financial data 200 in one of numerous locations by one of numerous methods known to those of skill in the art and/or as discussed herein.

In one embodiment, all, or part, of the user's financial data is obtained by process for providing relevant search results using financial data 200, and/or a computing system implemented financial management system, at OBTAIN A USER'S FINANCIAL DATA OPERATION 203 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a user to pay for and/or conduct financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a user to pay for and/or conduct financial transactions.

In one embodiment, all, or part, of the user's financial data is obtained by process for providing relevant search results using financial data 200 at OBTAIN A USER'S FINANCIAL DATA OPERATION 203 from user input through a user interface device such as keyboard 107, 157, mouse 111, 161 of FIG. 1 or a touchpad, voice command recognition system, or any other device capable of providing user input to a computing system or for translating user actions into computing system operations, whether available or known at the time of filing or as developed later.

Returning to FIG. 2, in one embodiment, all, or part, of the user's financial data is obtained by process for providing relevant search results using financial data 200 at OBTAIN A USER'S FINANCIAL DATA OPERATION 203 from any combination of the above sources and/or from any other source of a user's financial data whether known at the time of filing or as developed thereafter.

In one embodiment, once the user's financial data is obtained at OBTAIN A USER'S FINANCIAL DATA OPERATION 203, the data is stored in whole, or in part, in a database maintained by, accessible by, owned by, or otherwise related to: process for providing relevant search results using financial data 200, and/or a provider of process for providing relevant search results using financial data 200; a computing system implemented financial management system, and/or a provider of a computing system implemented financial management system; one or more search engines and/or search engine providers; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable storage medium, and/or any other computer program product, as defined herein. In one embodiment, the data, in whole, or in part, is stored on a webpage, in a web-based system or on a public network such as the Internet.

Returning to FIG. 2, in some embodiments, the user's financial data stored as described above is maintained, in whole, or in part, by: process for providing relevant search results using financial data 200, and/or a provider of process for providing relevant search results using financial data 200; a computing system implemented financial management system, and/or a provider of a computing system implemented financial management system; one or more search engines and/or search engine providers; a third party data storage institution; any third party service or institution; or any other parties. In one embodiment, access to the user's financial data is then provided to process for providing relevant search results using financial data 200, and/or a computing system implemented financial management system by providing access to the data and/or providing the data on a computer program product.

In one embodiment, the user's financial data is obtained by process for providing relevant search results using financial data 200 using/from a computing system implemented financial management system at OBTAIN A USER'S FINANCIAL DATA OPERATION 203, process flow proceeds to THE USER INITIATES A NETWORK SEARCH AND PROVIDES ONE OR MORE NETWORK SEARCH PARAMETERS OPERATION 205.

In one embodiment, at THE USER INITIATES A NETWORK SEARCH AND PROVIDES ONE OR MORE NETWORK SEARCH PARAMETERS OPERATION 205 a user initiates a network search using one or more network search parameters such as one or more keywords and/or phrases.

In one embodiment, at THE USER INITIATES A NETWORK SEARCH AND PROVIDES ONE OR MORE NETWORK SEARCH PARAMETERS OPERATION 205 the user initiates a network search by providing the one or more network search parameters through an interface display on a computing system, such as computing systems 100 and/or 150 of FIG. 1, using an interface device, such as a mouse, keyboard, voice entry system, or similar mechanism for converting user actions into computing system implemented operations.

Returning to FIG. 2, in one embodiment, at THE USER INITIATES A NETWORK SEARCH AND PROVIDES ONE OR MORE NETWORK SEARCH PARAMETERS OPERATION 205 the user initiates a network search by providing the one or more network search parameters through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1. As discussed above, network 130 can be any network or network system that is of interest to a user such as a Local Area Network (LAN), a Wide Area Network (WAN), a public network, such as the Internet, a private network, a combination of network types, or any other network capable of allowing communication between two or more computing systems, whether available or known at the time of filing or as later developed.

Returning to FIG. 2, in one embodiment, at THE USER INITIATES A NETWORK SEARCH AND PROVIDES ONE OR MORE NETWORK SEARCH PARAMETERS OPERATION 205 the user initiates a network search by providing the one or more network search parameters through an Internet browser, such as internet browser capability 182 of FIG. 1

In one embodiment, at THE USER INITIATES A NETWORK SEARCH AND PROVIDES ONE OR MORE NETWORK SEARCH PARAMETERS OPERATION 205 the one or more network search parameters are one or more key words and/or phrases that are used to perform a search of one or more networks, such as the Internet, for web-pages/sites, files, or any other data sources, that match, partially match, or are related to, the one or more network search parameters provided by the user THE USER INITIATES A NETWORK SEARCH AND PROVIDES ONE OR MORE NETWORK SEARCH PARAMETERS OPERATION 205. As discussed in more detail below, in one embodiment, defining the meaning, and/or scope of meaning, of the one or more network search parameters, e.g., keywords and/or phrases provided by the user THE USER INITIATES A NETWORK SEARCH AND PROVIDES ONE OR MORE NETWORK SEARCH PARAMETERS OPERATION 205, may be highly determinative of the search results provided.

Methods, means, process, and procedures for initiating a network search are well known to those of skill in the art. Consequently, a more detailed discussion of the methods, means, process, and procedures for initiating a network search is omitted here to avoid detracting from the invention.

In one embodiment, once a user initiates a network search using one or more network search parameters, such as one or more keywords and/or phrases, at THE USER INITIATES A NETWORK SEARCH AND PROVIDES ONE OR MORE NETWORK SEARCH PARAMETERS OPERATION 205, process flow proceeds to DEFINE THE SCOPE OF THE ONE OR MORE NETWORK SEARCH PARAMETERS BASED, AT LEAST IN PART, ON THE USER'S FINANCIAL DATA OPERATION 207.

In one embodiment, at DEFINE THE SCOPE OF THE ONE OR MORE NETWORK SEARCH PARAMETERS BASED, AT LEAST IN PART, ON THE USER'S FINANCIAL DATA OPERATION 207 the scope of the one or more network search parameters of THE USER INITIATES A NETWORK SEARCH AND PROVIDES ONE OR MORE NETWORK SEARCH PARAMETERS OPERATION 205, and therefore the scope of the eventual network search to be performed, is determined, at least in part, based on the user's financial data obtained at OBTAIN A USER'S FINANCIAL DATA OPERATION 203.

In one embodiment, at DEFINE THE SCOPE OF THE ONE OR MORE NETWORK SEARCH PARAMETERS BASED, AT LEAST IN PART, ON THE USER'S FINANCIAL DATA OPERATION 207 how the one or more network search parameters provided to the search engine by the user are interpreted to perform the search and/or how closely a given potential search result web-page/site, file, or other data source must be to the one or more network search parameters in order to be displayed as a search result, i.e., the definition, scope and range of equivalents applied to the one or more network search parameters provided to the search engine by the user at THE USER INITIATES A NETWORK SEARCH AND PROVIDES ONE OR MORE NETWORK SEARCH PARAMETERS OPERATION 205 is determined and/or modified based, at least in part, on the user's financial data of OBTAIN A USER'S FINANCIAL DATA OPERATION 203; In one embodiment, in addition to, or as a supplement for, the general usage/meaning of the one or more network search parameters as well as, in one embodiment, data regarding historical searches performed by the user, data regarding the historical usage of the one or more network search parameters by other searchers, and/or other search related and/or generalized user related data.

As a specific example of one possible embodiment, assume at THE USER INITIATES A NETWORK SEARCH AND PROVIDES ONE OR MORE NETWORK SEARCH PARAMETERS OPERATION 205 the user enters a network search parameter in the form of a keyword, such as "repair". Using current systems, i.e., absent process for providing relevant search results using financial data 200, a search would typically be conducted for all web-page/sites, files, or other data sources including and/or regarding repairs, which, as a specific example, might include: auto repair; eye glass repair; home repair; credit repair; or any one of numerous other possible repair related web-page/sites, files, or other data sources. As a result, using current systems, i.e., absent process for providing relevant search results using financial data 200, thousands of irrelevant search results would be obtained, processed and displayed to the user.

In contrast, using process for providing relevant search results using financial data 200, in this one example of one embodiment, at DEFINE THE SCOPE OF THE ONE OR MORE NETWORK SEARCH PARAMETERS BASED, AT LEAST IN PART, ON THE USER'S FINANCIAL DATA OPERATION 207, process for providing relevant search results using financial data 200 would access/search the user's financial data of OBTAIN A USER'S FINANCIAL DATA OPERATION 203 to try and find financial transactions that might help define/modify the network search parameters of THE USER INITIATES A NETWORK SEARCH AND PROVIDES ONE OR MORE NETWORK SEARCH PARAMETERS OPERATION 205 more narrowly, or in a way more likely to meet the specific needs of the given user.

Continuing with the specific example above, if we stipulate that at THE USER INITIATES A NETWORK SEARCH AND PROVIDES ONE OR MORE NETWORK SEARCH PARAMETERS OPERATION 205 the user enters a network search parameter in the form of a keyword, such as "repair", in one embodiment, at DEFINE THE SCOPE OF THE ONE OR MORE NETWORK SEARCH PARAMETERS BASED, AT LEAST IN PART, ON THE USER'S FINANCIAL DATA OPERATION 207, process for providing relevant search results using financial data 200 would access/search the user's financial data of OBTAIN A USER'S FINANCIAL DATA OPERATION 203 to try and find financial transactions that might help define the network search parameters of THE USER INITIATES A NETWORK SEARCH AND PROVIDES ONE OR MORE NETWORK SEARCH PARAMETERS OPERATION 205 more narrowly. In this instance, process for providing relevant search results using financial data 200 might find that over the past month the user has conducted five separate financial transactions with a hardware store. As a result, in one example, at DEFINE THE SCOPE OF THE ONE OR MORE NETWORK SEARCH PARAMETERS BASED, AT LEAST IN PART, ON THE USER'S FINANCIAL DATA OPERATION 207, process for providing relevant search results using financial data 200 would determine, based in part on these five separate financial transactions with the hardware store, that the term "repair" entered by the user as a network search parameter at THE USER INITIATES A NETWORK SEARCH AND PROVIDES ONE OR MORE NETWORK SEARCH PARAMETERS OPERATION 205 should be interpreted as "home repair". Consequently, using process for providing relevant search results using financial data 200, the user entering the keyword "repair" would result in the far fewer, and potentially more relevant, search result associated with the modified scope of "home repair".

As another specific example, we will stipulate that at THE USER INITIATES A NETWORK SEARCH AND PROVIDES ONE OR MORE NETWORK SEARCH PARAMETERS OPERATION 205 the user enters a network search parameter in the form of a keyword, such as "automobile for sale". Using current systems, i.e., absent process for providing relevant search results using financial data 200, a search would typically be conducted for all web-page/sites, files, or other data sources including and/or regarding repairs, which as a specific example, might include all types of automobiles ranging from economy cars to high-end specialty cars, ranging in price from hundreds of dollars to hundreds of thousands of dollars. Once again, using current systems, i.e., absent process for providing relevant search results using financial data 200, thousands of irrelevant search results could be obtained, processed and displayed to the user.

However, using process for providing relevant search results using financial data 200, in this one example of one embodiment, at DEFINE THE SCOPE OF THE ONE OR MORE NETWORK SEARCH PARAMETERS BASED, AT LEAST IN PART, ON THE USER'S FINANCIAL DATA OPERATION 207, process for providing relevant search results using financial data 200 would access/search the user's financial data of OBTAIN A USER'S FINANCIAL DATA OPERATION 203 to try and find financial data that might help define the network search parameters of THE USER INITIATES A NETWORK SEARCH AND PROVIDES ONE OR MORE NETWORK SEARCH PARAMETERS OPERATION 205 more narrowly, or in a way more likely to meet the specific needs of the given user.

Continuing with the specific example above, if we stipulate that at THE USER INITIATES A NETWORK SEARCH AND PROVIDES ONE OR MORE NETWORK SEARCH PARAMETERS OPERATION 205 the user enters a network search parameter in the form of a key word phrase, such as "automobile for sale", in one embodiment, at DEFINE THE SCOPE OF THE ONE OR MORE NETWORK SEARCH PARAMETERS BASED, AT LEAST IN PART, ON THE USER'S FINANCIAL DATA OPERATION 207, process for providing relevant search results using financial data 200 would access/search the user's financial data of OBTAIN A USER'S FINANCIAL DATA OPERATION 203 to try and find data that might help define the network search parameters of THE USER INITIATES A NETWORK SEARCH AND PROVIDES ONE OR MORE NETWORK SEARCH PARAMETERS OPERATION 205 more narrowly. In this instance, process for providing relevant search results using financial data 200 might find that the net worth and/or income of the user is relatively low. As a result, in one example, at DEFINE THE SCOPE OF THE ONE OR MORE NETWORK SEARCH PARAMETERS BASED, AT LEAST IN PART, ON THE USER'S FINANCIAL DATA OPERATION 207, process for providing relevant search results using financial data 200 would determine, based in part on user's net worth and/or income, that the phrase "automobile for sale" entered by the user as a network search parameter at THE USER INITIATES A NETWORK SEARCH AND PROVIDES ONE OR MORE NETWORK SEARCH PARAMETERS OPERATION 205 should be interpreted as "economy automobile for sale" or "automobile for sale+sale price less than $30,000.00". Consequently, using process for providing relevant search results using financial data 200, a user entering the keyword phrase "automobile for sale" would result in the far fewer, and potentially more relevant, search result associated with the modified scope of "economy automobile for sale" or "automobile for sale+sale price less than $30,000.00".

As noted, the examples above are very specific exemplary and hypothetical discussions of but two possible examples under two possible embodiments. Consequently, the examples discussed above do not limit the claims as presented below.

In one embodiment, once the scope of the one or more network search parameters of THE USER INITIATES A NETWORK SEARCH AND PROVIDES ONE OR MORE NETWORK SEARCH PARAMETERS OPERATION 205, and therefore the scope of the eventual network search to be performed, is determined and/or modified, at least in part, based on the user's financial data obtained at OBTAIN A USER'S FINANCIAL DATA OPERATION 203 at DEFINE THE SCOPE OF THE ONE OR MORE NETWORK SEARCH PARAMETERS BASED, AT LEAST IN PART, ON THE USER'S FINANCIAL DATA OPERATION 207, process flow proceeds to PERFORM THE NETWORK SEARCH USING THE ONE OR MORE NETWORK SEARCH PARAMETERS OPERATION 209.

In one embodiment, at PERFORM THE NETWORK SEARCH USING THE ONE OR MORE NETWORK SEARCH PARAMETERS OPERATION 209 the network search initiated at THE USER INITIATES A NETWORK SEARCH AND PROVIDES ONE OR MORE NETWORK SEARCH PARAMETERS OPERATION 205 is performed using the network search parameters, as interpreted/modified at DEFINE THE SCOPE OF THE ONE OR MORE NETWORK SEARCH PARAMETERS BASED, AT LEAST IN PART, ON THE USER'S FINANCIAL DATA OPERATION 207.

In one embodiment, the network search performed at PERFORM THE NETWORK SEARCH USING THE ONE OR MORE NETWORK SEARCH PARAMETERS OPERATION 209 searches the desired network, such as the Internet or any network known, as defined herein, or developed after the time of filing, and obtains search results based on how closely a given web-page/site, file, or other data source matches the one or more network search parameters provided at THE USER INITIATES A NETWORK SEARCH AND PROVIDES ONE OR MORE NETWORK SEARCH PARAMETERS OPERATION 205, as interpreted/modified by at DEFINE THE SCOPE OF THE ONE OR MORE NETWORK SEARCH PARAMETERS BASED, AT LEAST IN PART, ON THE USER'S FINANCIAL DATA OPERATION 207 and a range of equivalents applied to the one or more network search parameters.

As noted above, in one embodiment, the network search performed at PERFORM THE NETWORK SEARCH USING THE ONE OR MORE NETWORK SEARCH PARAMETERS OPERATION 209 is not only based on the one or more network search parameters provided at THE USER INITIATES A NETWORK SEARCH AND PROVIDES ONE OR MORE NETWORK SEARCH PARAMETERS OPERATION 205, as interpreted/modified by at DEFINE THE SCOPE OF THE ONE OR MORE NETWORK SEARCH PARAMETERS BASED, AT LEAST IN PART, ON THE USER'S FINANCIAL DATA OPERATION 207, but also as interpreted based on, in one embodiment, data regarding historical searches performed by the user, data regarding the historical usage of the one or more network search parameters by other searchers, and/or other search related and/or generalized user related data.

In one embodiment, the network search performed at PERFORM THE NETWORK SEARCH USING THE ONE OR MORE NETWORK SEARCH PARAMETERS OPERATION 209 generates one or more search results. In one embodiment, the search results are links to the web-pages/sites, files, or any other data sources, that match, partially match, or are related to, the one or more network search parameters provided at THE USER INITIATES A NETWORK SEARCH AND PROVIDES ONE OR MORE NETWORK SEARCH PARAMETERS OPERATION 205, as interpreted/modified by at DEFINE THE SCOPE OF THE ONE OR MORE NETWORK SEARCH PARAMETERS BASED, AT LEAST IN PART, ON THE USER'S FINANCIAL DATA OPERATION 207. In one embodiment, the search results are displayed to the user in a search results display page on a computing system. In one embodiment, the search results are displayed in the search results display page as a listing of links that, when selected by the user, take the user to the selected web-page/site, file, or any other data source. In one embodiment, the search results are displayed in the search results display page in a video data format as one or more video files.

In one embodiment, once the network search initiated at THE USER INITIATES A NETWORK SEARCH AND PROVIDES ONE OR MORE NETWORK SEARCH PARAMETERS OPERATION 205 is performed using the network search parameters, as interpreted/modified by at DEFINE THE SCOPE OF THE ONE OR MORE NETWORK SEARCH PARAMETERS BASED, AT LEAST IN PART, ON THE USER'S FINANCIAL DATA OPERATION 207, at PERFORM THE NETWORK SEARCH USING THE ONE OR MORE NETWORK SEARCH PARAMETERS OPERATION 209, process flow proceeds to LIST THE SEARCH RESULTS IN AN ALGORITHMIC SEARCH RESULTS DISPLAY BASED, AT LEAST IN PART, ON THE USER'S FINANCIAL DATA OPERATION 211.

In one embodiment, at LIST THE SEARCH RESULTS IN AN ALGORITHMIC SEARCH RESULTS DISPLAY BASED, AT LEAST IN PART, ON THE USER'S FINANCIAL DATA OPERATION 211 the search results of the network search of PERFORM THE NETWORK SEARCH USING THE ONE OR MORE NETWORK SEARCH PARAMETERS OPERATION 209 are provided to the user.

In one embodiment, at LIST THE SEARCH RESULTS IN AN ALGORITHMIC SEARCH RESULTS DISPLAY BASED, AT LEAST IN PART, ON THE USER'S FINANCIAL DATA OPERATION 211 the search results of the network search of PERFORM THE NETWORK SEARCH USING THE ONE OR MORE NETWORK SEARCH PARAMETERS OPERATION 209 are listed in an algorithmic search results display section of a search results display page on one or more computing systems, such as computing systems 100 and/or 150 of FIG. 1.

Returning to FIG. 2, in one embodiment, at LIST THE SEARCH RESULTS IN AN ALGORITHMIC SEARCH RESULTS DISPLAY BASED, AT LEAST IN PART, ON THE USER'S FINANCIAL DATA OPERATION 211 the search results of the network search of PERFORM THE NETWORK SEARCH USING THE ONE OR MORE NETWORK SEARCH PARAMETERS OPERATION 209 are listed in an algorithmic search results display section of a search results display page and the listing order of the search results listed in an algorithmic search results display is determined, at least in part, based on the user's financial data.

As an example, in one embodiment, the order of the search results of the network search of PERFORM THE NETWORK SEARCH USING THE ONE OR MORE NETWORK SEARCH PARAMETERS OPERATION 209 are listed according to analysis based on the user's financial data of OBTAIN A USER'S FINANCIAL DATA OPERATION 203 regarding how likely a given search result is determined to be relevant to the user's needs.

Continuing with the specific examples introduced above, assume at THE USER INITIATES A NETWORK SEARCH AND PROVIDES ONE OR MORE NETWORK SEARCH PARAMETERS OPERATION 205 the user enters a network search parameter in the form of a keyword, such as "repair". Using current systems, i.e., absent process for providing relevant search results using financial data 200, results for all web-page/sites, files, or other data sources including and/or regarding repairs, which as a specific example, might include: auto repair; eye glass repair; home repair; credit repair; or any one of numerous other possible repair related web-page/sites, files, or other data sources would be displayed based on currently used basic algorithmic search results display rules such as, but not limited to: listing search results in an order based on the relevancy of a given search result to the one or more network search parameters provided to the search engine by the user, i.e., how closely a given search result matches the one or more network search parameters, typically with the most relevant search results being listed first; how often, or how many of, the one or more network search parameters appear in the search result, typically with the search results having the most occurrences being listed first; how many users have viewed the search results, typically with the search results having the most viewings being listed first; how many other data sources, files, web-pages/sites link to the search results, typically with the search results being most linked to being listed first; and/or any combination of the forgoing algorithmic search results display rules or any one or more of numerous other algorithmic search results display rules.

As a result, using current systems, i.e., absent process for providing relevant search results using financial data 200, thousands of irrelevant search results would be obtained, processed and displayed, potentially rather randomly, to the user.

In contrast, using process for providing relevant search results using financial data 200, in this one example of one embodiment, at LIST THE SEARCH RESULTS IN AN ALGORITHMIC SEARCH RESULTS DISPLAY BASED, AT LEAST IN PART, ON THE USER'S FINANCIAL DATA OPERATION 211 process for providing relevant search results using financial data 200 would access/search the user's financial data of OBTAIN A USER'S FINANCIAL DATA OPERATION 203 to try and find financial transactions that might help determine a results listing order in an algorithmic search results display section of a search results display page that would be more likely to meet the specific needs of the given user.

Continuing with the specific example above, if we stipulate that at THE USER INITIATES A NETWORK SEARCH AND PROVIDES ONE OR MORE NETWORK SEARCH PARAMETERS OPERATION 205 the user enters a network search parameter in the form of a keyword, such as "repair", in one embodiment, at DEFINE THE SCOPE OF THE ONE OR MORE NETWORK SEARCH PARAMETERS BASED, AT LEAST IN PART, ON THE USER'S FINANCIAL DATA OPERATION 207, process for providing relevant search results using financial data 200 would access/search the user's financial data of OBTAIN A USER'S FINANCIAL DATA OPERATION 203 to try and find financial transactions that might help determine a results listing order in an algorithmic search results display section of a search results display page that would be more likely to meet the specific needs of the given user. In this instance, process for providing relevant search results using financial data 200 might find that over the past month the user has conducted five separate financial transactions with a hardware store. As a result, in one example, at LIST THE SEARCH RESULTS IN AN ALGORITHMIC SEARCH RESULTS DISPLAY BASED, AT LEAST IN PART, ON THE USER'S FINANCIAL DATA OPERATION 211 process for providing relevant search results using financial data 200 would determine, based in part on these five separate financial transactions with the hardware store, that the results listing order in an algorithmic search results display section of a search results display page should list "home repair" results first.

Using the other specific example introduced above, we will stipulate that at THE USER INITIATES A NETWORK SEARCH AND PROVIDES ONE OR MORE NETWORK SEARCH PARAMETERS OPERATION 205 the user enters a network search parameter in the form of a keyword, such as "automobile for sale". Using current systems, i.e., absent process for providing relevant search results using financial data 200, a search would be conducted for all web-page/sites, files, or other data sources including and/or regarding repairs, which as a specific example, might include all types of automobiles ranging from economy cars to high-end specialty cars, ranging in price from hundreds of dollars to hundreds of thousands of dollars. Once again, using current systems, i.e., absent process for providing relevant search results using financial data 200, thousands of irrelevant search results could be obtained, processed and displayed to the user in rather random order.

However, using process for providing relevant search results using financial data 200, in this one example of one embodiment, at LIST THE SEARCH RESULTS IN AN ALGORITHMIC SEARCH RESULTS DISPLAY BASED, AT LEAST IN PART, ON THE USER'S FINANCIAL DATA OPERATION 211, process for providing relevant search results using financial data 200 would access/search the user's financial data of OBTAIN A USER'S FINANCIAL DATA OPERATION 203 to try and find financial data that might help determine a results listing order in an algorithmic search results display section of a search results display page that would be more likely to meet the specific needs of the given user. In this specific example, if we stipulate that at THE USER INITIATES A NETWORK SEARCH AND PROVIDES ONE OR MORE NETWORK SEARCH PARAMETERS OPERATION 205 the user enters a network search parameter in the form of a key word phrase, such as "automobile for sale", in one embodiment, at LIST THE SEARCH RESULTS IN AN ALGORITHMIC SEARCH RESULTS DISPLAY BASED, AT LEAST IN PART, ON THE USER'S FINANCIAL DATA OPERATION 211, process for providing relevant search results using financial data 200 might find that the net worth and/or income of the user is relatively low. As a result, in one example, at LIST THE SEARCH RESULTS IN AN ALGORITHMIC SEARCH RESULTS DISPLAY BASED, AT LEAST IN PART, ON THE USER'S FINANCIAL DATA OPERATION 211, process for providing relevant search results using financial data 200 would determine, based in part on user's net worth and/or income, that the results listing order in an algorithmic search results display section of a search results display page should list economy automobiles, or automobiles with specific sale price caps, such as less than $30,000.00, first.

In one embodiment, the processing/filtering of DEFINE THE SCOPE OF THE ONE OR MORE NETWORK SEARCH PARAMETERS BASED, AT LEAST IN PART, ON THE USER'S FINANCIAL DATA OPERATION 207 is combined by process for providing relevant search results using financial data 200 with the results display processing of LIST THE SEARCH RESULTS IN AN ALGORITHMIC SEARCH RESULTS DISPLAY BASED, AT LEAST IN PART, ON THE USER'S FINANCIAL DATA OPERATION 211 to achieve highly customized, and potentially very relevant, results for the user at LIST THE SEARCH RESULTS IN AN ALGORITHMIC SEARCH RESULTS DISPLAY BASED, AT LEAST IN PART, ON THE USER'S FINANCIAL DATA OPERATION 211.

In one embodiment, once the search results of the network search of PERFORM THE NETWORK SEARCH USING THE ONE OR MORE NETWORK SEARCH PARAMETERS OPERATION 209 are provided to the user at LIST THE SEARCH RESULTS IN AN ALGORITHMIC SEARCH RESULTS DISPLAY BASED, AT LEAST IN PART, ON THE USER'S FINANCIAL DATA OPERATION 211, process flow proceeds to EXIT OPERATION 230. In one embodiment, at EXIT OPERATION 230, process for providing relevant search results using financial data 200 is exited to await new data.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Using process for providing relevant search results using financial data 200, users are provided algorithmic searches and search results that are more accurate and customized to the user based on the user's financial data. Consequently, using process for providing relevant search results using financial data the ability to customize search results to a specific user is improved significantly.

In one embodiment, a listing order/position, and/or placement location, of a given search result in a sponsored search results section of a search results display page is offered to a given search result's owner/sponsor/source based, at least in part, on the user's financial data, and the consideration paid for the listing order/position, and/or placement location, of the given search result in the sponsored search results display section of the search results display page is determined based, at least in part, on the user's financial data.

Figure 3:
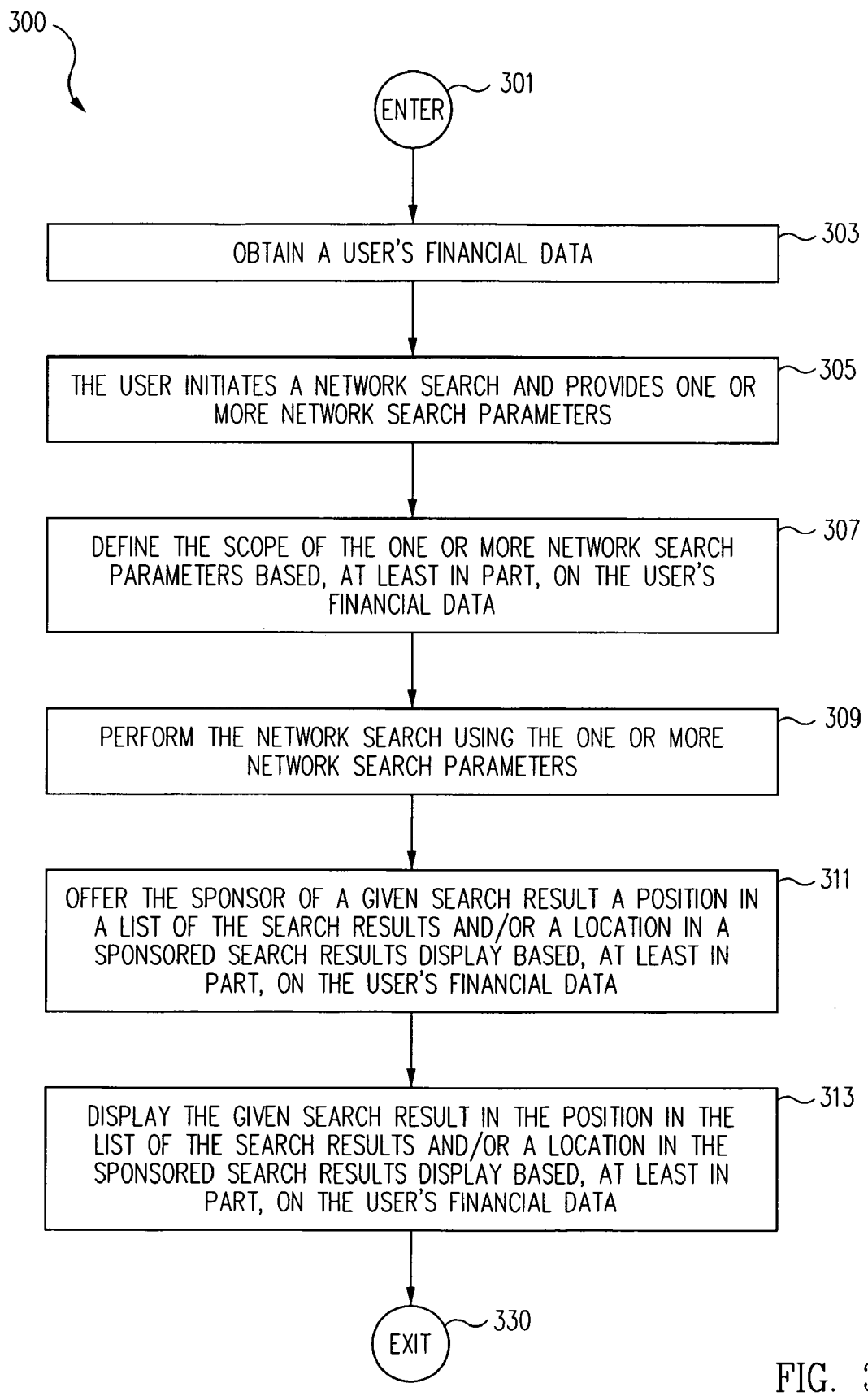
FIG. 3 is a flow chart depicting a process for providing relevant search results using financial data in accordance with one embodiment.

FIG. 3 a flow chart depicting a process for providing relevant search results using financial data 300 in accordance with one embodiment. Process for providing relevant search results using financial data 300 begins at ENTER OPERATION 301 of FIG. 3 and process flow proceeds to OBTAIN A USER'S FINANCIAL DATA OPERATION 303.

In one embodiment: OBTAIN A USER'S FINANCIAL DATA OPERATION 303; THE USER INITIATES A NETWORK SEARCH AND PROVIDES ONE OR MORE NETWORK SEARCH PARAMETERS OPERATION 305; DEFINE THE SCOPE OF THE ONE OR MORE NETWORK SEARCH PARAMETERS BASED, AT LEAST IN PART, ON THE USER'S FINANCIAL DATA OPERATION 307; and PERFORM THE NETWORK SEARCH USING THE ONE OR MORE NETWORK SEARCH PARAMETERS OPERATION 309 of process for providing relevant search results using financial data 300 are substantially identical to: OBTAIN A USER'S FINANCIAL DATA OPERATION 203; THE USER INITIATES A NETWORK SEARCH AND PROVIDES ONE OR MORE NETWORK SEARCH PARAMETERS OPERATION 205; DEFINE THE SCOPE OF THE ONE OR MORE NETWORK SEARCH PARAMETERS BASED, AT LEAST IN PART, ON THE USER'S FINANCIAL DATA OPERATION 207; and PERFORM THE NETWORK SEARCH USING THE ONE OR MORE NETWORK SEARCH PARAMETERS OPERATION 209 of process for providing relevant search results using financial data 200. Consequently, the discussion above with respect to: OBTAIN A USER'S FINANCIAL DATA OPERATION 203; THE USER INITIATES A NETWORK SEARCH AND PROVIDES ONE OR MORE NETWORK SEARCH PARAMETERS OPERATION 205; DEFINE THE SCOPE OF THE ONE OR MORE NETWORK SEARCH PARAMETERS BASED, AT LEAST IN PART, ON THE USER'S FINANCIAL DATA OPERATION 207; and PERFORM THE NETWORK SEARCH USING THE ONE OR MORE NETWORK SEARCH PARAMETERS OPERATION 209 of process for providing relevant search results using financial data 200 is equally applicable to, and incorporated herein in it's entirety for: OBTAIN A USER'S FINANCIAL DATA OPERATION 303; THE USER INITIATES A NETWORK SEARCH AND PROVIDES ONE OR MORE NETWORK SEARCH PARAMETERS OPERATION 305; DEFINE THE SCOPE OF THE ONE OR MORE NETWORK SEARCH PARAMETERS BASED, AT LEAST IN PART, ON THE USER'S FINANCIAL DATA OPERATION 307; and PERFORM THE NETWORK SEARCH USING THE ONE OR MORE NETWORK SEARCH PARAMETERS OPERATION 309 of process for providing relevant search results using financial data 300.

In one embodiment, once the network search initiated at THE USER INITIATES A NETWORK SEARCH AND PROVIDES ONE OR MORE NETWORK SEARCH PARAMETERS OPERATION 305 is performed using the network search parameters, as interpreted/modified by at DEFINE THE SCOPE OF THE ONE OR MORE NETWORK SEARCH PARAMETERS BASED, AT LEAST IN PART, ON THE USER'S FINANCIAL DATA OPERATION 307, at PERFORM THE NETWORK SEARCH USING THE ONE OR MORE NETWORK SEARCH PARAMETERS OPERATION 309, process flow proceeds to OFFER THE SPONSOR OF A GIVEN SEARCH RESULT A POSITION IN A LIST OF THE SEARCH RESULTS AND/OR A LOCATION IN A SPONSORED SEARCH RESULTS DISPLAY BASED, AT LEAST IN PART, ON THE USER'S FINANCIAL DATA OPERATION 311.

In one embodiment, at OFFER THE SPONSOR OF A GIVEN SEARCH RESULT A POSITION IN A LIST OF THE SEARCH RESULTS AND/OR A LOCATION IN A SPONSORED SEARCH RESULTS DISPLAY BASED, AT LEAST IN PART, ON THE USER'S FINANCIAL DATA OPERATION 311, a listing order/position, and/or placement location, of a given search result in a sponsored search results section of a search results display page is offered to a given search result's owner/sponsor/source based, at least in part, on the user's financial data.

In one embodiment, at OFFER THE SPONSOR OF A GIVEN SEARCH RESULT A POSITION IN A LIST OF THE SEARCH RESULTS AND/OR A LOCATION IN A SPONSORED SEARCH RESULTS DISPLAY BASED, AT LEAST IN PART, ON THE USER'S FINANCIAL DATA OPERATION 311, the consideration paid for the listing order/position, and/or placement location, of the given search result in the sponsored search results display section of the search results display page is determined based, at least in part, on the user's financial data.

As discussed above, unlike typical algorithmic search results displays, sponsored search results displays typically list search results in an order, and/or in a location, that is determined based on the owner/sponsor/source of a given search result, and the owner/sponsor/source paying a fee to the search engine provider to have the owner's/sponsor's/source's web-page/site, file, or other data source, displayed in a specific order, and/or in a specific location, within the sponsored search results display. As also discussed above, many search results display pages provide algorithmic search results displays, such as would result from process for providing relevant search results using financial data 200 of FIG. 2, and sponsored search results displays, such as would result from process for providing relevant search results using financial data 300 of FIG. 3, in a single search results display page, typically with the algorithmic search results display in the middle section of the search results display page and the sponsored search results displays at the top, bottom, and/or side of the search results display page.

In one embodiment, based, at least in part, on the financial data obtained at OBTAIN A USER'S FINANCIAL DATA OPERATION 303, a given search result owned and/or sponsored by/or related to an owning party is offered a listing order/position, and/or placement location, based, at least in part, on the user's financial data and the owning party is charged consideration for the listing order/position, and/or placement location, of the given search result in the sponsored search results display section of the search results display page based, at least in part, on the user's financial data.

As a specific example, we stipulate that a given user's financial data of OBTAIN A USER'S FINANCIAL DATA OPERATION 303 indicates that the user is a frequent shopper at a first retail store, for instance, the user's financial data of OBTAIN A USER'S FINANCIAL DATA OPERATION 303 may include multiple financial transactions where the first retail store is the payee.

Let us further stipulate that the user initiates a search and provides a network search parameter at THE USER INITIATES A NETWORK SEARCH AND PROVIDES ONE OR MORE NETWORK SEARCH PARAMETERS OPERATION 305 that potentially includes products sold by both the first retail store and a competitor of the first retail store, a second retail store. In this instance, the second retail store may be particularly interested in taking the user's business away from the first retail store; likewise, the first retail store may be particularly interested in keeping the user as a patron. Either way, one, or both, of the first retail store and the second retail store may desire, and be willing to pay a premium fee, to secure a specific listing order/position, and/or placement location, of their web page/site, file, or other data source in a sponsored search results section of a search results display page at OFFER THE SPONSOR OF A GIVEN SEARCH RESULT A POSITION IN A LIST OF THE SEARCH RESULTS AND/OR A LOCATION IN A SPONSORED SEARCH RESULTS DISPLAY BASED, AT LEAST IN PART, ON THE USER'S FINANCIAL DATA OPERATION 311.

As another example, assume that a given user's financial data of OBTAIN A USER'S FINANCIAL DATA OPERATION 303 indicates that the user has a high net worth. A seller of luxury products and/or services may desire, and be willing to pay a premium fee, in order to secure a specific listing order/position, and/or placement location, of their web page/site, file, or other data source in a sponsored search results section of a search results display page at OFFER THE SPONSOR OF A GIVEN SEARCH RESULT A POSITION IN A LIST OF THE SEARCH RESULTS AND/OR A LOCATION IN A SPONSORED SEARCH RESULTS DISPLAY BASED, AT LEAST IN PART, ON THE USER'S FINANCIAL DATA OPERATION 311.

As noted, the examples above are very specific exemplary and hypothetical discussions of but two possible examples, under two possible embodiments. Consequently, the examples discussed above do not limit the claims as presented below.

In one embodiment, once a listing order/position, and/or placement location, of a given search result in a sponsored search results section of a search results display page is offered to a given search result's owner/sponsor/source based, at least in part, on the user's financial data at OFFER THE SPONSOR OF A GIVEN SEARCH RESULT A POSITION IN A LIST OF THE SEARCH RESULTS AND/OR A LOCATION IN A SPONSORED SEARCH RESULTS DISPLAY BASED, AT LEAST IN PART, ON THE USER'S FINANCIAL DATA OPERATION 311, process flow proceeds to DISPLAY THE GIVEN SEARCH RESULT IN THE POSITION IN THE LIST OF THE SEARCH RESULTS AND/OR A LOCATION IN THE SPONSORED SEARCH RESULTS DISPLAY BASED, AT LEAST IN PART, ON THE USER'S FINANCIAL DATA OPERATION 313.

In one embodiment, at DISPLAY THE GIVEN SEARCH RESULT IN THE POSITION IN THE LIST OF THE SEARCH RESULTS AND/OR A LOCATION IN THE SPONSORED SEARCH RESULTS DISPLAY BASED, AT LEAST IN PART, ON THE USER'S FINANCIAL DATA OPERATION 313, the given search result of OFFER THE SPONSOR OF A GIVEN SEARCH RESULT A POSITION IN A LIST OF THE SEARCH RESULTS AND/OR A LOCATION IN A SPONSORED SEARCH RESULTS DISPLAY BASED, AT LEAST IN PART, ON THE USER'S FINANCIAL DATA OPERATION 311 is listed/displayed in the listing order/position, and/or placement location, determined at OFFER THE SPONSOR OF A GIVEN SEARCH RESULT A POSITION IN A LIST OF THE SEARCH RESULTS AND/OR A LOCATION IN A SPONSORED SEARCH RESULTS DISPLAY BASED, AT LEAST IN PART, ON THE USER'S FINANCIAL DATA OPERATION 311 in a sponsored search results section of a search results display page based, at least in part, on the user's financial data at OFFER THE SPONSOR OF A GIVEN SEARCH RESULT A POSITION IN A LIST OF THE SEARCH RESULTS AND/OR A LOCATION IN A SPONSORED SEARCH RESULTS DISPLAY BASED, AT LEAST IN PART, ON THE USER'S FINANCIAL DATA OPERATION 311.

In one embodiment, once the given search result is listed/displayed in the listing order/position, and/or placement location, determined at OFFER THE SPONSOR OF A GIVEN SEARCH RESULT A POSITION IN A LIST OF THE SEARCH RESULTS AND/OR A LOCATION IN A SPONSORED SEARCH RESULTS DISPLAY BASED, AT LEAST IN PART, ON THE USER'S FINANCIAL DATA OPERATION 311 in a sponsored search results section of a search results display page at DISPLAY THE GIVEN SEARCH RESULT IN THE POSITION IN THE LIST OF THE SEARCH RESULTS AND/OR A LOCATION IN THE SPONSORED SEARCH RESULTS DISPLAY BASED, AT LEAST IN PART, ON THE USER'S FINANCIAL DATA OPERATION 313, process flow proceeds to EXIT OPERATION 330 and process for providing relevant search results using financial data 300 is exited to await new data.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Using process for providing relevant search results using financial data 300, users are provided sponsored search results that are more accurate and customized to the user based on the user's financial data. In addition, using the method and system for providing relevant search results using financial data disclosed herein, owners/sponsors/sources of search results shown in a sponsored search results display can target users more specifically based on the user's financial data. Consequently, using process for providing relevant search results using financial data 300, the ability to customize search results to a specific user is improved significantly.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "defining", "searching", "finding", "alerting", "accessing", "analyzing", "obtaining", "deriving", "determining", "collecting", "creating", "identifying", "transferring", "storing", "comparing", "providing", "performing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus.

Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of the embodiments include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A computing system implemented process for providing relevant search results using financial data comprising:

obtaining a user's financial data, the user's financial data being associated with the user;

the user initiating a network search request and providing one or more network search parameters;

modifying the definition of one or more of the one or more network search parameters based on the user's financial data;

performing the user initiated network search using the modified definition of one or more of the one or more network search parameters; and providing the user with the search results from the user initiated network search performed using the modified definition of one or more of the one or more network search parameters;

wherein obtaining a user's financial data comprises obtaining financial data associated with a user from the group of financial data associated with a user including:

data representing one or more specific financial transactions;

data indicating the user's total assets;

data indicating the user's total liabilities;

data indicating the user's net worth;

data indicating the user's average discretionary spending;

data indicating the user's age group; and demographic data regarding the user or the user's spending.

2. The computing system implemented process for providing relevant search results using financial data of claim 1, wherein;

obtaining a user's financial data comprises obtaining a user's financial data using a computing system implemented financial management system.

3. The computing system implemented process for providing relevant search results using financial data of claim 1, wherein;

the network is the Internet.

4. The computing system implemented process for providing relevant search results using financial data of claim 1, wherein;

one or more of one or more of the one or more network search parameters is a keyword or keyword phrase.

5. The computing system implemented process for providing relevant search results using financial data of claim 1, wherein;

modifying the definition of one or more of the one or more network search parameters based on the user's financial data comprises narrowing the scope of one or more of the one or more network search parameters based on the user's financial data.

6. A computing system implemented process for providing relevant search results using financial data comprising:

obtaining a user's financial data, the user's financial data being associated with the user;

the user initiating a network search request and providing one or more network search parameters;

performing the user initiated network search using the one or more network search parameters; and providing the user with the a list of the search results from the user initiated network search performed using the one or more network search parameters in an algorithmic search results display, the specific order of the listings of the search results in list of the search results being determined based, at least in part, on the user's financial data;

wherein obtaining a user's financial data comprises obtaining financial data associated with a user from the group of financial data associated with a user including:

data representing one or more specific financial transactions;

data indicating the user's total assets;

data indicating the user's total liabilities;

data indicating the user's net worth;

data indicating the user's average discretionary spending;

data indicating the user's age group; and demographic data regarding the user or the user's spending.

7. The computing system implemented process for providing relevant search results using financial data of claim 6, wherein;

obtaining a user's financial data comprises obtaining a user's financial data using a computing system implemented financial management system.

8. The computing system implemented process for providing relevant search results using financial data of claim 6, wherein;

the network is the Internet.

9. A computing system implemented process for providing relevant search results using financial data comprising:

obtaining a user's financial data, the user's financial data being associated with the user;

the user initiating a network search request and providing one or more network search parameters;

performing the user initiated network search using the one or more network search parameters; and providing the user with a list of the search results from the user initiated network search performed using the one or more network search parameters in an sponsored search results display, the specific location of a given search result being based, at least in part, on an owner of the given search result providing consideration for the specific location of the given search result, the consideration for the specific location of the given search result being determined based, at least in part, on the user's financial data;

wherein obtaining a user's financial data comprises obtaining financial data associated with a user from the group of financial data associated with a user including:

data representing one or more specific financial transactions;

data indicating the user's total assets;

data indicating the user's total liabilities;

data indicating the user's net worth;

data indicating the user's average discretionary spending;

data indicating the user's age group; and demographic data regarding the user or the user's spending.

10. The computing system implemented process for providing relevant search results using financial data of claim 9, wherein;

obtaining a user's financial data comprises obtaining a user's financial data using a computing system implemented financial management system.

11. The computing system implemented process for providing relevant search results using financial data of claim 9, wherein;

the network is the Internet.

12. A computer program product for providing a process for providing relevant search results using financial data comprising:

a computer readable storage medium;

and computer program code, encoded on the computer readable storage medium, comprising computer readable instructions for:

obtaining a user's financial data, the user's financial data being associated with the user;

the user initiating a network search request and providing one or more network search parameters;

modifying the definition of one or more of the one or more network search parameters based on the user's financial data;

performing the user initiated network search using the modified definition of one or more of the one or more network search parameters; and providing the user with the search results from the user initiated network search performed using the modified definition of one or more of the one or more network search parameters;

wherein obtaining a user's financial data comprises obtaining financial data associated with a user from the group of financial data associated with a user including:

data representing one or more specific financial transactions;

data indicating the user's total assets;

data indicating the user's total liabilities;

data indicating the user's net worth;

data indicating the user's average discretionary spending;

data indicating the user's age group; and demographic data regarding the user or the user's spending.

13. The computer program product for providing a process for providing relevant search results using financial data of claim 12, wherein;

obtaining a user's financial data comprises obtaining a user's financial data using a computing system implemented financial management system.

14. The computer program product for providing a process for providing relevant search results using financial data of claim 12, wherein;

the network is the Internet.

15. The computer program product for providing a process for providing relevant search results using financial data of claim 12, wherein;

one or more of one or more of the one or more network search parameters is a keyword or keyword phrase.

16. The computer program product for providing a process for providing relevant search results using financial data of claim 12, wherein;

modifying the definition of one or more of the one or more network search parameters based on the user's financial data comprises narrowing the scope of one or more of the one or more network search parameters based on the user's financial data.

17. A computer program product for providing a process for providing relevant search results using financial data comprising:

a computer readable storage medium;

and computer program code, encoded on the computer readable storage medium, comprising computer readable instructions for:

obtaining a user's financial data, the user's financial data being associated with the user;

the user initiating a network search request and providing one or more network search parameters;

performing the user initiated network search using the one or more network search parameters; and providing the user with the a list of the search results from the user initiated network search performed using the one or more network search parameters in an algorithmic search results display, the specific order of the listings of the search results in list of the search results being determined based, at least in part, on the user's financial data;

wherein obtaining a user's financial data comprises obtaining financial data associated with a user from the group of financial data associated with a user including:

data representing one or more specific financial transactions;

data indicating the user's total assets;

data indicating the user's total liabilities;

data indicating the user's net worth;

data indicating the user's average discretionary spending;

data indicating the user's age group; and demographic data regarding the user or the user's spending.

18. The computer program product for providing a process for providing relevant search results using financial data of claim 17, wherein;

obtaining a user's financial data comprises obtaining a user's financial data using a computing system implemented financial management system.

19. The computer program product for providing a process for providing relevant search results using financial data of claim 17, wherein;

the network is the Internet.

20. A computer program product for providing a process for providing relevant search results using financial data comprising:

a computer readable storage medium;

and computer program code, encoded on the computer readable storage medium, comprising computer readable instructions for:

obtaining a user's financial data, the user's financial data being associated with the user;

the user initiating a network search request and providing one or more network search parameters;

performing the user initiated network search using the one or more network search parameters; and providing the user with the a list of the search results from the user initiated network search performed using the one or more network search parameters in an sponsored search results display, the specific location of a given search result being based, at least in part, on an owner of the given search result providing consideration for the specific location of the given search result, the consideration for the specific location of the given search result being determined based, at least in part, on the user's financial data;

wherein obtaining a user's financial data comprises obtaining financial data associated with a user from the group of financial data associated with a user including:

data representing one or more specific financial transactions;

data indicating the user's total assets;

data indicating the user's total liabilities;

data indicating the user's net worth;

data indicating the user's average discretionary spending;

data indicating the user's age group; and demographic data regarding the user or the user's spending.

21. The computer program product for providing a process for providing relevant search results using financial data of claim 20, wherein;

obtaining a user's financial data comprises obtaining a user's financial data using a computing system implemented financial management system.

22. The computer program product for providing a process for providing relevant search results using financial data of claim 20, wherein;
the network is the Internet.

23. A computer-implemented method for providing relevant search results using financial data comprising:
obtaining a user's financial data, the user's financial data being associated with the user;
the user initiating a network search request and providing one or more network search parameters;
modifying the definition of one or more of the one or more network search parameters based on the user's financial data;
performing the user initiated network search using the modified definition of one or more of the one or more network search parameters; and
providing the user with the search results from the user initiated network search performed using the modified definition of one or more of the one or more network search parameters;
wherein obtaining a user's financial data comprises obtaining financial data associated with a user from the group of financial data associated with a user including:
data representing one or more specific financial transactions;
data indicating the user's total assets;
data indicating the user's total liabilities;
data indicating the user's net worth;
data indicating the user's average discretionary spending;
data indicating the user's age group; and
demographic data regarding the user or the user's spending.

24. The method for providing relevant search results using financial data of claim 23, wherein;
modifying the definition of one or more of the one or more network search parameters based on the user's financial data comprises narrowing the scope of one or more of the one or more network search parameters based on the user's financial data.

25. A computer-implemented method for providing relevant search results using financial data comprising:
obtaining a user's financial data, the user's financial data being associated with the user;
the user initiating a network search request and providing one or more network search parameters;
performing the user initiated network search using the one or more network search parameters; and
providing the user with the a list of the search results from the user initiated network search performed using the one or more network search parameters in an algorithmic search results display, the specific order of the listings of the search results in list of the search results being determined based, at least in part, on the user's financial data;
wherein obtaining a user's financial data comprises obtaining financial data associated with a user from the group of financial data associated with a user including:
data representing one or more specific financial transactions;
data indicating the user's total assets;
data indicating the user's total liabilities;
data indicating the user's net worth;
data indicating the user's average discretionary spending;
data indicating the user's age group; and
demographic data regarding the user or the user's spending.

26. A computer-implemented method for providing relevant search results using financial data comprising:
obtaining a user's financial data, the user's financial data being associated with the user;
the user initiating a network search request and providing one or more network search parameters;
performing the user initiated network search using the one or more network search parameters; and
providing the user with the a list of the search results from the user initiated network search performed using the one or more network search parameters in an sponsored search results display, the specific location of a given search result being based, at least in part, on an owner of the given search result providing consideration for the specific location of the given search result, the consideration for the specific location of the given search result being determined based, at least in part, on the user's financial data;
wherein obtaining a user's financial data comprises obtaining financial data associated with a user from the group of financial data associated with a user including:
data representing one or more specific financial transactions;
data indicating the user's total assets;
data indicating the user's total liabilities;
data indicating the user's net worth;
data indicating the user's average discretionary spending;
data indicating the user's age group; and
demographic data regarding the user or the user's spending.

* * * * *

UNITED STATES PATENT AND TRADEMARK OFFICE
CERTIFICATE OF CORRECTION

PATENT NO. : 7,877,402 B1  Page 1 of 1
APPLICATION NO. : 12/014711
DATED : January 25, 2011
INVENTOR(S) : Benjamin Weiss et al.

It is certified that error appears in the above-identified patent and that said Letters Patent is hereby corrected as shown below:

In Column 29, Line 58, Claim 6, between "with" and "a list" delete "the";
In Column 29, Line 62, Claim 6, replace "in list" with --in the list--;
In Column 30, Line 28, Claim 9, between "with" and "a list" delete "the";
In Column 30, Line 30, Claim 9, replace "an sponsored" with --a sponsored--;
In Column 31, Line 63, Claim 17, between "with" and "a list" delete "the";
In Column 32, Line 1, Claim 17, replace "in list" with --in the list--;
In Column 32, Line 39, Claim 20, between "with" and "a list" delete "the";
In Column 32, Line 41, Claim 20, replace "an sponsored" with --a sponsored--;
In Column 33, Line 48, Claim 25, between "with" and "a list" delete "the";
In Column 34, Line 3, Claim 25, replace "in list" with --in the list--;
In Column 34, Line 26, Claim 26, between "with" and "a list" delete "the"; and
In Column 34, Line 28, Claim 26, replace "an sponsored" with --a sponsored--.

Signed and Sealed this
Second Day of October, 2012

David J. Kappos
*Director of the United States Patent and Trademark Office*